United States Patent
Takizawa

(10) Patent No.: US 8,993,075 B2
(45) Date of Patent: Mar. 31, 2015

(54) STRETCHED FILM, PROCESS FOR PRODUCING THE SAME, AND LIQUID CRYSTAL DISPLAY DEVICE

(75) Inventor: Tadashi Takizawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 401 days.

(21) Appl. No.: 12/744,909

(22) PCT Filed: Nov. 12, 2008

(86) PCT No.: PCT/JP2008/070588
§ 371 (c)(1),
(2), (4) Date: May 26, 2010

(87) PCT Pub. No.: WO2009/069469
PCT Pub. Date: Jun. 4, 2009

(65) Prior Publication Data
US 2010/0310793 A1 Dec. 9, 2010

(30) Foreign Application Priority Data
Nov. 27, 2007 (JP) .................. 2007-305977

(51) Int. Cl.
*B32B 27/08* (2006.01)
*B29C 55/02* (2006.01)
*B29C 55/16* (2006.01)
*B32B 27/30* (2006.01)
*G02B 5/30* (2006.01)
*B29K 25/00* (2006.01)
*B29K 33/00* (2006.01)

(52) U.S. Cl.
CPC .............. *B29C 55/023* (2013.01); *B29C 55/16* (2013.01); *B29K 2025/00* (2013.01); *B29K 2033/08* (2013.01); *B29K 2995/0032* (2013.01); *B32B 27/08* (2013.01); *B32B 27/30* (2013.01); *G02B 5/3083* (2013.01)
USPC .............. 428/1.33; 428/1.1; 264/2.7; 264/1.6; 264/1.7; 264/290.2; 264/210.2

(58) Field of Classification Search
CPC ............ B29D 7/00; B29D 7/01; B29D 11/00; B29D 11/0073; B29D 11/0074; B29D 11/00788; B29D 11/00798; B32B 7/00; B32B 7/005; B32B 7/02; B32B 7/04; B32B 17/10; B32B 17/10009; B32B 17/10036; B32B 17/10045; B32B 17/10073; B32B 17/1055; B32B 17/10807; B32B 17/10935; B32B 27/06; B32B 27/08; B32B 27/30; B32B 27/302; B32B 27/308; B32B 38/18; B32B 38/1825; B32B 2038/0012; B32B 2038/0028; B32B 2250/03; B32B 2250/24; B32B 2250/40; B32B 2307/40; B32B 2307/412; B32B 2307/42; B32B 2307/514; B32B 2307/52
USPC ............ 428/1.1, 1.31, 212, 1.33; 359/485.02; 264/1.6, 1.7, 2.7, 290.2, 210.2, 210.7
See application file for complete search history.

(56) References Cited

U.S. PATENT DOCUMENTS

| | | | | |
|---|---|---|---|---|
| 3,557,265 | A * | 1/1971 | Chisholm et al. | 264/46.1 |
| 2005/0185124 | A1 * | 8/2005 | Kadoya | 349/117 |
| 2006/0100403 | A1 * | 5/2006 | Yoon et al. | 526/218.1 |
| 2006/0115610 | A1 * | 6/2006 | Nagashima | 428/1.3 |
| 2007/0046865 | A1 * | 3/2007 | Umeda et al. | 349/96 |
| 2007/0092663 | A1 * | 4/2007 | Murakami | 428/1.31 |
| 2007/0172606 | A1 * | 7/2007 | Shunsuke et al. | 428/1.31 |
| 2007/0275183 | A1 * | 11/2007 | Hashimoto | 428/1.2 |
| 2009/0103012 | A1 * | 4/2009 | Itadani et al. | 349/96 |
| 2009/0286098 | A1 | 11/2009 | Yajima et al. | |

FOREIGN PATENT DOCUMENTS

| | | | | |
|---|---|---|---|---|
| JP | 2004-133313 A | 4/2004 | | |
| JP | 2004-233666 A | 8/2004 | | |
| JP | 2005-274725 A | 10/2005 | | |
| JP | 2007-72201 A | 3/2007 | | |
| JP | 2007-233198 A | 9/2007 | | |
| JP | 2007-264534 A | 10/2007 | | |
| WO | WO 2005050300 A1 * | 6/2005 | .............. | G02F 1/3363 |
| WO | WO 2006013869 A1 * | 2/2006 | .............. | G02B 5/30 |

OTHER PUBLICATIONS

International search report dated Feb. 10, 2009 issued in corresponding PCT/JP2008/070588.

* cited by examiner

*Primary Examiner* — Erik Kashnikow
*Assistant Examiner* — Eli D Strah
(74) *Attorney, Agent, or Firm* — Birch, Stewart, Kolasch & Birch, LLP

(57) ABSTRACT

A stretched film comprised of a "$B_1$" layer comprised of a thermoplastic resin 1, an "A" layer comprised of a styrene-based resin, and a "$B_2$" layer comprised of a thermoplastic resin 2 stacked in that order and having a width of over 1000 mm, wherein a ratio of the "A" layer in the stretched film is 45 wt % or less, an average value of an orientation angle θ with respect to a width direction across at least 1000 mm of the width direction is 0°±1°, a variation in orientation angle θ is 0.5° or less, and a value of an Nz coefficient is −3.5 to −0.5 in range.

12 Claims, No Drawings

STRETCHED FILM, PROCESS FOR PRODUCING THE SAME, AND LIQUID CRYSTAL DISPLAY DEVICE

TECHNICAL FIELD

The present invention relates to a stretched film, a process for producing the same, and a liquid crystal display device.

BACKGROUND ART

A liquid crystal display device has high image quality, thin size, light weight, low power consumption, and other features and therefore is being widely used for televisions, personal computers, car navigation systems, etc. A liquid crystal display device has two polarizers arranged above and below liquid crystal cells so that their transmission axes perpendicularly intersect and applies voltage to the liquid crystal cells so as to change the orientations of the liquid crystal molecules and display an image on a screen. In a twisted nematic mode liquid crystal display device, at the time of application of voltage, the liquid crystal molecules are oriented vertically and black is displayed in most configurations. In an in-place switching (IPS) mode liquid crystal display device, at the time of no application of voltage, the liquid crystal molecules are oriented in a certain direction, while at the time of application of voltage, the direction of orientation rotates 45 degrees and white is displayed in most configurations.

In a liquid crystal display device where two polarizers are arranged so that their transmission axes perpendicularly intersect in the longitudinal and lateral directions, when viewing the screen from the longitudinal and lateral directions, sufficient contrast is obtained. However, when viewing the screen from a direction off from the longitudinal and lateral directions, the transmission axis of the inlet side polarizer and the transmission axis of the outlet side polarizer no longer perpendicularly intersect in appearance, so linear polarized light cannot be completely blocked, light leakage occurs, sufficient black is not obtained, and the contrast ends up falling. For this reason, attempts are being made to add an optical compensating means to the liquid crystal display device so as to prevent a drop in the contrast of the screen.

Such optical compensating means have been developed and improved on in the past. For example, Japanese Patent Publication (A) No. 2004-133313 discloses an optical laminate comprised of an "A" layer containing a material with a negative intrinsic birefringence as a main ingredient on at least one surface of which a "B" layer containing a transparent resin as a main ingredient is laminated, in which optical laminate a variation of in-plane direction retardation Re is within ±10 nm. Further, Japanese Patent Publication (A) No. 2005-274725 discloses an optical laminate comprised of an "A" layer containing a resin with a negative intrinsic birefringence value on at least one surface of which a substantially non-oriented "B" layer comprised of a transparent resin is laminated, in which optical laminate the in-plane direction retardation Re of the "A" layer is set to a value over the in-plane direction retardation Re of the "B" layer. Furthermore, Japanese Patent Publication (A) No. 2007-72201 discloses an anisotropic stretched film containing a styrene-based resin in 50 wt % or more, which has a heat shrinkage stress at a predetermined temperature, in-plane direction retardation, and orientation angle set to predetermined ranges of variation.

The styrene-based resins used in these Patent Literatures have high transparency and negative intrinsic birefringence values, so are considered effective materials for expressing desired optical characteristics. However, there is the problem that films using these are extremely fragile and often break or wrinkle during the continuous transport at the time of stretching for expressing the desired optical characteristics, are no good in workability (stretchability), and are low in the durability of the stretched film after working. Further, there is the problem that reduction of the variation in in-plane direction retardation Re or the variation in orientation angle θ is difficult and that it is difficult to produce a stretched film superior in optical uniformity.

To deal with these problems, the above-mentioned Japanese Patent Publication (A) No. 2007-72201 sets the difference of the heat shrinkage stress at the (Vicat temperature+ 30° C.) in the flow (MD) direction and the width (TD) direction at 0.5 to 8.0 MPa, but the results are still not sufficient. Further, in the above-mentioned Japanese Patent Publication (A) No. 2004-133313 or the above-mentioned Japanese Patent Publication (A) No. 2005-274725, the improvement is made by laminating on at least one surface of a layer comprised of a styrene-based resin a transparent resin layer and stretching the laminate. These can be said to be effective techniques, but there is room for further improvement.

Further, to eliminate the dependency on the angle of the field of vision, a stretched film for producing a particularly suitable optical device used for an IPS type liquid crystal display device changing the direction of the electric field from the conventional longitudinal one to a lateral one and switching the liquid crystal molecules while leaving them parallel to the substrate surface has been sought.

The present invention was made in consideration of this point and has as its object the provision of a stretched film superior in stretchability, durability, and optical uniformity.

Further, it has as its object the provision of a stretched film for producing a suitable optical device used for an IPS type liquid crystal display device and an IPS type liquid crystal display device excellent in display properties.

SUMMARY OF INVENTION

The inventors discovered that by laminating a thermoplastic resin on both surfaces of a layer comprised of a styrene-based resin while defining the content of the "A" layer comprised of the styrene-based resin to a predetermined amount or less and then simultaneously biaxial stretching the laminate, it is possible to produce a stretched film superior in stretchability, durability, and optical uniformity and able to realize superior display properties when used as a phase shift plate of an IPS type liquid crystal display device and completed the present invention based on this discovery.

That is, according to a first aspect of the present invention, there is provided a stretched film comprised of a "$B_1$" layer comprised of a thermoplastic resin 1, an "A" layer comprised of a styrene-based resin, and a "$B_2$" layer comprised of a thermoplastic resin 2 stacked in that order and having a width of over 1000 mm, wherein a ratio of the "A" layer in the stretched film is 45 wt % or less, an average value of an orientation angle θ with respect to a width direction across at least 1000 mm of the width direction is 0°±1°, a variation in orientation angle θ is 0.5° or less, and a value of an Nz coefficient is −3.5 to −0.5 in range. In this case, the ratio of the "A" layer is preferably 35 wt % or less.

Further, in this case, preferably the variation of the value of the Nz coefficient is 0.2 or less, the retardation Re of the in-plane direction is 80 nm or less, the variation of the retardation Re of the in-plane direction is 3 nm or less, and the retardation Re of at least one of the "$B_1$" layer and the "$B_2$"

layer is 0 nm to 15 nm in range. Furthermore, preferably a ratio of an average thickness of the "$B_1$" layer and an average thickness of the "A" layer ("$B_1$" layer/"A" layer) is 2/1 to 1/1, a ratio of an average thickness of the "$B_2$" layer and an average thickness of the "A" layer ("A" layer/"$B_2$" layer) is 1/1 to 1/2, and a haze is over 1% to 5%. Here, the "haze" is the ratio of the total light transmittance and diffused light transmittance in the incident light.

According to a second aspect of the present invention, there is provided an IPS type liquid crystal display device comprised of a phase shift plate or other optical device produced using the stretched film according to the first aspect of the present invention explained above.

According to a third aspect of the present invention, there is provided a process for producing the stretched film according to the first aspect of the present invention explained above including a step of using melt coextrusion to obtain an unstretched laminate "c" comprised of a "$b_1$" layer comprised of a thermoplastic resin 1, an "a" layer comprised of a styrene-based resin, and a "$b_2$" layer comprised of a thermoplastic resin 2 stacked in that order and a step of stretching the laminate by simultaneous biaxial stretching. In this case, preferably the stretching temperature is less than a Vicat softening temperature+20° C. of the styrene-based resin. Further, preferably a stretching ratio in the longitudinal direction is 1.0 to 1.5 times a stretching ratio in the width direction.

According to the present invention, it is possible to provide a stretched film superior in stretchability, durability, and optical uniformity and, furthermore, for producing an optical device suitable for use for an IPS type liquid crystal display device. Further, it is possible to provide an IPS type liquid crystal display device excellent in display properties.

DESCRIPTION OF EMBODIMENTS

The stretched film according to the present invention is a long stretched film comprised of a "$B_1$" layer comprised of a thermoplastic resin, an "A" layer comprised of a styrene-based resin, and a "$B_2$" layer comprised of a thermoplastic resin 2 stacked in that order and having a width of over 1000 mm, wherein the ratio of the "A" layer is 45 wt % or less, an average value of an orientation angle θ with respect to a width direction across at least 1000 mm of the width direction is 0°±1°, a variation in orientation angle is 0.5° or less, and a value of an Nz coefficient is −3.5 to −0.5 in range. Note that, here, "long" means having a length of at least 5 times or more of the width of the film, preferably has a length of 10 times or more, specifically has a length of an extent for storage or transport rolled up.

The "A" layer is a layer comprised of a styrene-based resin. The styrene-based resin is a thermoplastic resin with a negative intrinsic birefringence value. Note that, the "resin with a negative intrinsic birefringence value" is a resin with a birefringence rate in the orientation direction of the molecules smaller than the birefringence rate in the other directions, for example, is a resin having the smallest birefringence rate in the stretching direction when stretching a shaped article using this. The intrinsic birefringence value ($\Delta n_0$) is a value calculated by the following formula (1):

$$\Delta n_0 = (2\pi/9)(Nd/M)((na^2+2)^2/na)(\alpha 1 - \alpha 2) \quad (1)$$

where, π is the circle ratio, N is Avogadro's number, d is the density, M is the molecular weight, na is the average bifringence rate, α1 is the polarization rate of the polymer in the molecular chain axial direction, and α2 is the polarization rate of the polymer in the direction longitudinal to the molecular chain axis.

The styrene-based resin contained in the "A" layer in the present invention is a resin having styrene unit structures as part or all of the repeating units. A polystyrene or a copolymer of styrene, α-methylstyrene, o-methylstyrene, p-methylstyrene, p-chlorostyrene, p-nitrostyrene, p-aminostyrene, p-carboxystyrene, p-phenylstyrene, or other styrene-based monomer with ethylene, propylene, butadiene, isoprene, acrylonitrile, methacrylonitrile, α-chloroacrylonitrile, N-phenylmaleimide, methyl acrylate, methyl methacrylate, ethyl acrylate, ethyl methacrylate, acrylic acid, methacrylic acid, maleic anhydride, vinyl acetate, or other monomer etc. may be mentioned. Among these, for the styrene-based resin, polystyrene, a copolymer of styrene and N-phenylmaleimide, or a copolymer of styrene and maleic anhydride can be preferably used.

The ratio of the "A" layer in the stretched film is 45 wt % or less, more preferably 35 wt % or less. The lower limit of the ratio of the "A" layer, from the viewpoint of expression of the desired optical characteristics, is about 20 wt %.

The "$B_1$" layer forming the stretched film of the present invention is comprised of the thermoplastic resin 1. In this embodiment, it is a substantially unoriented transparent layer. Further, the "$B_2$" layer is comprised of the thermoplastic resin 2. In this embodiment, it is a substantially unoriented transparent layer. As the thermoplastic resin 1 and thermoplastic resin 2, ones with total light transmittances measured when formed into test pieces of thicknesses of 1 mm of 70% or more are preferable, ones of 80% or more are more preferable, and ones of 90% or more are particularly preferable. As such thermoplastic resins 1 and 2, for example, an acrylic resin, methacrylic resin, polycarbonate resin, polyester resin, polyether sulfone resin, polyarylate resin, polyimide resin, chain polyolefin resin, polyethylene terephthalate resin, polysulfone resin, polyvinyl chloride resin, diacetyl cellulose resin, triacetyl cellulose resin, alicyclic olefin resin, etc. may be mentioned. Among these, as thermoplastic resins 1 and 2, an alicyclic olefin resin and methacrylic resin are preferable. Among these, if the thermoplastic resins 1 and 2 are methacrylic resins, the film as a whole can be given a photoelasticity of $3 \times 10^{-12}$ m$^2$/N or less. Frame trouble and other problems are eliminated. Note that, the thermoplastic resin 1 forming the "$B_1$" layer and the thermoplastic resin 2 forming the "$B_2$" layer may be of the same type or of different types.

A methacrylic resin is a polymer resin including methacrylic acid alkyl ester units as main monomer units. As the methacrylic resin, methylmethacrylate, ethyl methacrylate, and other homopolymers of methacrylic acid alkyl esters having C1 to C4 alkyl groups; homopolymers of methacrylic acid alkyl esters having C1 to C4 alkyl groups with the hydrogens of the alkyl groups substituted by OH groups, COOH groups, NH$_2$ groups, and other functional groups; or copolymers of methacrylic acid alkyl esters and styrene, vinyl acetate, α,β-monoethylenic unsaturated carboxylic acid, vinyl toluene, α-methylstyrene, acrylonitrile, acrylic acid alkyl esters, and other ethylenic unsaturated monomers other than methacrylic acid alkyl esters may be mentioned. These can be used alone in single types or in a combination of two or more types. Among these, a copolymer of an acrylic acid alkyl ester with a methacrylic acid alkyl ester is preferable. Preferable methacrylic resins contain methacrylic acid alkyl ester units having C1 to C4 alkyl groups substitutable by functional groups in preferably 50 to 100 wt %, more preferably 50 to 99.9 wt %, still more preferably 50 to 99.5 wt % and contain acrylic acid alkyl ester units in preferably 0 to 50 wt %, more preferably 0.1 to 50 wt %, still more preferably 0.5 to 50 wt %.

An alicyclic olefin resin is an amorphous thermoplastic resin having an alicyclic structure at the main chain and/or side chains. As the alicyclic structure in the alicyclic olefin resin, a saturated alicyclic hydrocarbon(cycloalkane) structure, unsaturated alicyclic hydrocarbon(cycloalkane) structure, etc. may be mentioned, but from the viewpoint of the mechanical strength, heat resistance, and other aspects, a cycloalkane structure is preferable. The number of carbon atoms forming the alicyclic structure is not particularly limited, but is usually 4 to 30, preferably 5 to 20, more preferably 5 to 15. At this time, the mechanical strength, heat resistance, and film shapability are balanced to a high degree and suitable.

The ratio of the repeating units having an alicyclic structure forming the alicyclic olefin resin is preferably 55 wt % or more, more preferably 70 wt % or more, particularly preferably 90 wt % or more. The ratio of the repeating units having the alicyclic structure in the alicyclic olefin resin being in this range is preferable from the viewpoint of the transparency and heat resistance.

As the alicyclic olefin resin, a norbornene resin, monocyclic cyclic olefin resin, cyclic conjugated diene resin, vinyl alicyclic type hydrocarbon resin, and their hydrogenates etc. may be mentioned. Among these, a norbornene resin is good in transparency and shapeability, so can be preferably used.

As norbornene resins, for example, ring-opening polymers of monomers having a norbornene structure, ring-opening copolymers of monomers having a norbornene structure and other monomers, or their hydrogenates; addition polymers of monomers having a norbornene structure, addition copolymers of monomers having a norbornene structure and other monomers, or their hydrogenates may be mentioned. Among these, ring-opening (co)polymer hydrogenates of monomers having norbornene structures can be particularly preferably used from the viewpoints of transparency, shapeability, heat resistance, low hygroscopicity, dimensional stability, lightweight, etc.

The thermoplastic resin 1 forming the "$B_1$" layer and the thermoplastic resin 2 forming the "$B_2$" layer have glass transition temperatures Tg(b) (when the types of thermoplastic resins are different, Tg(b1) and Tg(b2)) of preferably 40° C. or more, more preferably 60° C. or more.

The above-mentioned styrene-based resin forming the "A" layer, the thermoplastic resin 1 forming the "$B_1$" layer, and the thermoplastic resin 2 forming the "$B_2$" layer may have added to it, in accordance with need, an antioxidant, heat stabilizer, optical stabilizer, UV absorbent, anti-static agent, dispersant, chlorine trap, flame retardant, crystal nucleating agent, reinforcing agent, anti-blocking agent, antifogging agent, mold separation agent, pigment, organic or inorganic filler, neutralizing agent, lubricating agent, decomposing agent, metal deactivating agent, pollution preventing agent, antibacterial agent, or other resin, thermoplastic elastomer, and other known additives in a range not detracting from the effect of the present invention. The amount of addition of these additives is, with respect to the styrene-based resin forming the "A" layer, the thermoplastic resin 1 forming the "$B_1$" layer, or the thermoplastic resin 2 forming the "$B_2$" layer as 100 parts by weight, usually 0 to 50 parts by weight, preferably 0 to 30 parts by weight.

In the present invention, the retardation in the in-plane direction (below, referred to as the "in-plane retardation") Re(A) (nm) of the "A" layer is preferably 30 nm to 70 nm in range, while the in-plane retardation Re($B_2$) (nm) of at least one of the "$B_1$" layer and "$B_2$" layer is preferably 0 nm to 15 nm in range measured by light of a wavelength of 400 to 700 nm or |Re(A)|>|Re($B_1$)+Re($B_2$)|. By defining |Re(A)|>|Re($B_1$)+Re($B_2$)|, it is possible to effectively utilize the optical characteristics of an "A" layer comprised of a styrene-based resin with a negative intrinsic birefringence optically adjusted. If |Re(A)|<=|Re($B_1$)+Re($B_2$)|, the optical compensation function is liable not to be sufficiently expressed. Note that, the "in-plane retardation Re" is the difference between the refractive index nx in the in-plane slow axis direction and the refractive index ny in the direction perpendicularly intersecting the in-plane slow axis multiplied with the average thickness D of the films (layers), that is, Re=(nx−ny)×D.

In the present embodiment, regarding the "$B_1$" layer or "$B_2$" layer, "substantially unoriented" means when the difference of the birefringences nBx and nBy in the x-direction and y-direction perpendicularly intersecting in the "$B_1$" layer or "$B_2$" layer is small and when the value of |(nAx−nAy)dA|+|(nBx−nBy)dB| is 1.1 times or less of the value of |(nAx−nAy)dA| when the birefringences in the x-direction and y-direction perpendicularly intersecting in the "A" layer are nAx, nAy, the thickness of the "A" layer is dA, and the thickness of the "$B_1$" layer or "$B_2$" layer is dB. |Re($B_1$)+Re(B2)| is more preferably 20 nm or less, still more preferably 10 nm or less, particularly preferably 5 nm or less. If |Re($B_1$)+Re($B_2$)| exceeds 20 nm, the optical compensation function of stretched film is liable not to be sufficiently expressed.

An average value of the in-plane retardation Re (nm) of the stretched film of the laminate of the "A" layer, "$B_1$" layer, and "$B_2$" layer is preferably 80 nm or less. A variation of 3 nm or less is preferable.

The in-plane retardation Re of the stretched film is measured using an automatic birefringence meter at 50 mm intervals in the width direction of the stretched film. This was measured at 50 mm intervals in the flow direction of the stretched film across a length of 1000 mm. The average value of the measurement results was made the average value of the in-plane retardation Re. The variation in the in-plane retardation Re is defined as the largest value among the measurement results minus the smallest value.

Further, the stretched film of the laminate of the "A" layer, "$B_1$" layer, and "$B_2$" layer preferably has a variation of the Nz coefficient of 0.2 or less. Here, the Nz coefficient is expressed by Nz=(nx−nz)/(nx−ny) where the bifringence in the thickness direction is nz and the birefringences nx, ny (where, nx>ny) in two perpendicularly intersecting directions in the plane longitudinal to the thickness direction.

The Nz coefficient of the stretched film is measured using an automatic birefringence meter at 50 mm intervals in the width direction of the stretched film. This was measured at 50 mm intervals in the flow direction of the stretched film across a length of 1000 mm. The average value of the measurement results was made the Nz coefficient. Further, the variation in the Nz coefficient was defined as the difference between the largest value and smallest value of the Nz coefficient.

In the present invention, the ratio of the average thickness of the "$B_1$" layer and the average thickness of the "A" layer ("$B_1$" layer/"A" layer) is preferably 2/1 to 1/1, while the ratio of the average thickness of the "$B_2$" layer and the average thickness of the "A" layer ("A" layer/"$B_2$" layer) is preferably 1/1 to 1/2. Further, the total thickness of the stretched film of the laminate of the "A" layer, "$B_1$" layer, and "$B_2$" layer can be made 80 to 120 μm. Furthermore, the haze of the stretched film of the laminate of the "A" layer, "$B_1$" layer, and "$B_2$" layer is preferably over 1% to 5%. Here, the "haze" is the ratio of the transmittance of parallel light and transmittance of diffused light in the incident light. In addition, the stretched film of the laminate of the "A" layer, "$B_1$" layer, and "$B_2$" layer preferably has a tear strength in the longitudinal direction of 1 N/mm or more.

In the present invention, when the styrene-based resin forming the "A" layer and the thermoplastic resin forming the "B" layer have glass transition temperatures of Tg(a) (° C.) and Tg(b) (° C.) (when the types of the thermoplastic resins forming the "B$_1$" layer and "B$_2$" layer are different, Tg(b1) and Tg(b2)), Tg(a)>Tg(b)+8° C. is preferable, Tg(a)>Tg(b)+20° C. is more preferable, and Tg(a)>Tg(b)+24° C. is still more preferable. At this time, when there are two temperatures of Tg(b1) and Tg(b2), for the Tg(b) in the above relation, the higher temperature of the Tg(b1) and Tg(b2) is employed as a reference.

Further, when the styrene-based resin forming the "A" layer and the thermoplastic resin forming the "B" layer have Vicat softening temperatures of Teg(a) (° C.) and Teg(b) (° C.) (when the types of the thermoplastic resins forming the "B$_1$" layer and "B$_2$" layer are different, Teg(b1) and Teg(b2)), Teg(a)>Teg(b)+15° C. is preferable, Teg(a)>Teg(b)+20° C. is more preferable, while Teg(a)>Teg(b)+25° C. is further preferable. At this time, when there are two temperatures of Teg(b1) and Teg(b2), for the Teg(b) in the above relation, the higher temperature of the Teg(b1) and Teg(b2) is employed as a reference.

When costretching an unstretched laminate "c" comprised of an unstretched resin layer ("a" layer) comprised of a styrene-based resin and, at its two sides, unstretched resin layers comprised of a thermoplastic resin ("b$_1$" layer, "b$_2$" layer) stacked together, if stretching near the temperature Tg(a) (° C.), the birefringence characteristics of the "A" layer comprised of a styrene-based resin can be sufficiently and uniformly expressed. At this time, the unstretched resin layers ("b$_1$" layer and "b$_2$" layer) comprised of thermoplastic resins are stretched at a temperature higher by 20° C. or more from the glass transition temperature Tg(b) or Vicat softening temperature Teg(b), so the polymers are not oriented almost at all and a substantially unoriented state is reached.

The stretched film of the present invention may, in accordance with need, have the surface of the "B$_1$" layer and/or "B$_2$" layer roughened. The surface roughening means is not particularly limited. For example, corona discharge treatment, embossing, sandblasting, etching, deposition of microparticles, etc. may be mentioned. By roughening the surfaces of the B$_1$ and/or "B$_2$" layer, it is possible to improve the bondability.

The haze of the stretched film of the present invention can be adjusted by the amounts of addition of the above additives or surface roughening.

The stretched film of the present invention is comprised of an "A" layer comprised of a styrene-based resin on both surfaces of which a "B$_1$" layer and "B$_2$" layer comprised of thermoplastic resins are laminated. The ratio of the "A" layer in the stretched film is 45 wt % or less, so it is possible to prevent the occurrence of warping of the laminate due to the difference in the shrinkage rates of the different layers. Further, when mixing a UV absorbent, antioxidizing agent, and other additives to the styrene-based resin forming the "A" layer, it is possible to prevent the evaporation of the additives at the time of coextrusion or costretching and bleeding of the additives from the laminate. By mixing an antioxidizing agent into the easily oxidizable styrene-based resin forming the "A" layer, it is possible to effectively prevent degradation of the resin.

In the stretched film of the present invention, a binder layer may be provided between the "A" layer, "B$_1$" layer, and "B$_2$" layer. The binder layer can be formed from one having affinity with the "A" layer, "B$_1$" layer, and "B$_2$" layer forming the optical laminate. For example, an ethylene-methyl(meth) acrylate copolymer, ethylene-ethyl(meth)acrylate copolymer, and other ethylene-(meth)acrylic acid ester copolymers; ethylene-vinyl acetate copolymer, ethylene-styrene copolymer, and other ethylene-based copolymers or other olefin-based polymers may be mentioned. Further, these (co)polymers may be oxidized, saponified, chlorinated, chlorosulfonated, and other modified and used as modified products. The binder layer has a thickness of preferably 1 to 50 μm, more preferably 2 to 30 μm. In the stretched film of the present invention, in the case of including the binder layer, the binder has a glass transition temperature or softening point Tg(d) of preferably lower than the Tg(a) and Tg(b), more preferably lower than Tg(a) and Tg(b) by 15° C. or more.

The process for producing a stretched film in the present invention is comprised of a step of using melt coextrusion to successively form a "b$_1$" layer comprised of a thermoplastic resin 1, an "a" layer comprised of a styrene-based resin, and a "b$_2$" layer comprised of a thermoplastic resin 2 to obtain an unstretched laminate "c" and a step of simultaneous biaxial stretching of this unstretched laminate "c".

As the method for obtaining the unstretched laminate "c", the coextrusion T-die method, coextrusion inflation method, coextrusion lamination, or other shaping method using coextrusion, dry lamination or other film lamination shaping method, the coating method of coating a resin solution on the substrate resin film, and another known method can be suitably used. Among these, from the viewpoint of the production efficiency and not leaving behind a solvent or other volatile ingredient in the film, a shaping method using coextrusion is preferable. The extrusion temperature may be suitably selected in accordance with the styrene-based resin forming the "A" layer, the thermoplastic resin 1 forming the "B$_1$" layer, and the thermoplastic resin 2 forming the "B$_2$" layer used and the type of the binder used in accordance with need. The unstretched laminate "c" is a long multilayer film and has a width of 1000 mm or more.

The unstretched laminate "c" is stretched, for example, using a pantograph type simultaneous biaxial stretching apparatus provided with a plurality of clips running along a pair of guide rails. This simultaneous biaxial stretching apparatus stretches the film in the longitudinal direction (flow direction) by opening the interval between clips holding the same and simultaneously stretches the film in the lateral direction (width direction) by the broadening angle of the guide rails. In sequential biaxial stretching where the difference in peripheral speeds of the rolls is utilized for stretching in the longitudinal direction, then the two ends are gripped by the clips and stretched in the lateral direction using a tenter, the film is stretched in the longitudinal direction, then the resin is cooled once and, afterward, is reheated for stretching in the lateral direction, so heat relaxation causes the desired optical characteristics obtained by stretching in the longitudinal direction to end up changing at the time of stretching in the lateral direction and it is difficult to realize the desired characteristics, but with simultaneous biaxial stretching, there is no such problem. It is possible to obtain stretched film having good optical characteristics.

The unstretched laminate "c" preferably has a stretching temperature of the Vicat softening temperature of the styrene-based resin minus 4° C. or more and preferably a Vicat softening temperature of styrene-based resin plus 4° C. or more. Further, the unstretched laminate "c" preferably has a stretching temperature of less than the styrene-based resin's Vicat softening temperature+20° C., more preferably less than the styrene-based resin's Vicat softening temperature+10° C. This is because if set in this range, the stretch suitability (operability) is good. Further, the stretching ratio in the longitudinal direction is preferably 1.0 to 1.5 times of the stretching ratio in the width direction in range.

The target in-plane retardation Re of the stretched film to be produced can be expressed by adjusting the transport speed of the film (line speed) at the time of simultaneous biaxial stretching. This transport speed is preferably adjusted to 12 to 16 m/min in range. If less than 12 m/min, bowing (disturbance of the orientation angle profile) proceeds, while if over 16 m/min, reverse bowing proceeds.

The profile of the orientation angle can be made flat as much as possible, that is, the average value of orientation angle θ with respect to the width direction can be made 0°±1° and the variation in the orientation angle θ can be made 0.5° or less, by fine adjustment by the stretching conditions (fine stretching, heat fixing temperature, and takeup tension).

Here, this "fine stretching" means a small amount of stretching or shrinking of the film in the oven in a simultaneous biaxial stretching apparatus before the end of stretching (final stretching ratio not changed). The heat fixing temperature is the temperature of the heating zone for stabilizing the film arranged near the outside of the oven outlet of the simultaneous biaxial stretching apparatus (temperature lower than stretching temperature). The takeup tension is similarly the tension acting in the flow direction of the film in the section from near the outside of the oven outlet to the takeup of the film.

Fine stretching becomes possible by adjusting the rail pattern of the tenter of the simultaneous biaxial stretching apparatus.

The heat fixing temperature can be set in the temperature range of the (stretching temperature −30° C.) to less than the stretching temperature. If bowing occurs, usually, this is adjusted by fine stretching as shown above, but it may also be adjusted by raising the heat fixing temperature or lowering the takeup tension. Further, similarly, when reverse bowing occurs, the heat fixing temperature is lowered or the takeup tension is raised to enable fine adjustment so that the profile of the orientation angle becomes flat.

By stacking the stretched film of the present invention and a polarizer, it is possible to obtain an optical device able to be used for a liquid crystal display device etc. As the polarizer, it is possible to use a polarizer comprised of a polyvinyl alcohol-based polarizing film etc. containing a dichroic substance on one or both sides of which a transparent protective film forming a protective layer is bonded through a suitable adhesive layer. As the polarizer, for example, a film comprised of a polyvinyl alcohol or partially formalized polyvinyl alcohol or other conventional suitable vinyl alcohol-based polymer film dyed by a dichroic substance comprised of iodine or other dichroic dye, stretched, cross-linked, and otherwise suitably processed in a suitable order or systems so that when natural light strikes it, linear polarized light is passed is used. In particular, one with a superior light transmittance and polarization degree is preferable. The thickness of the polarizer is generally 5 to 80 μm, but the invention is not limited to this.

As the protective film material forming the transparent protective layer provided on one or both sides of the polarizer, a suitable transparent film can be used. Among these, a film comprised of a polymer superior in transparency, mechanical strength, heat stability, moisture barrier property, etc. is preferably used. As the polymer, acetate resin such as triacetyl cellulose or polyester resin, polyether sulfone resin, polycarbonate resin, polyamide resin, polyimide resin, chain type polyolefin resin, alicyclic olefin resin, acrylic resin, methacrylic resin, etc. may be mentioned. Among these, from the viewpoint of a small birefringence, an acetate resin or alicyclic olefin resin are preferable, while from the viewpoints of the transparency, low hygroscopicity, dimensional stability, lightweight, etc., an alicyclic olefin resin is particularly preferable. The transparent protective film may be of any thickness, but in general, for the purpose of reducing the thickness of the polarizer etc., it is 500 μm or less, preferably 5 to 300 μm, or particularly preferably 5 to 150 μm.

The stretched film of the present invention and polarizer may be laminated by using a binder or tackifier or other suitable bonding means. As the binder or tackifier, for example, an acryl-based, silicon-based, polyester-based, polyurethane-based, polyether-based, rubber-based, or other one may be mentioned. Among these, from the viewpoint of the heat resistance, transparency, etc., an acryl-based one is preferable. The stretched film and polarizer are laminated so that the slow axis of the stretched film and the transmission axis of the polarizer are parallel or perpendicular. As the lamination method, a known method may be mentioned. For example, the method of cutting out and laminating a stretched film and polarizer and the method of laminating a long stretched film and long polarizer by the roll-to-roll method may be mentioned. This stretched film can also serve as a transparent protective film for the laminated polarizer so the device can be reduced in thickness. This optical device has a thickness of usually 100 to 700 μm, preferably 200 to 600 μm.

The optical film (phase shift plate etc.) produced using the stretched film according to the present invention can be used to obtain a liquid crystal display device. As the mode for assembling the optical film into the liquid crystal display device, the mode of arranging the optical film between a polarizer and liquid crystal cell and the mode of arranging the optical film at a polarizer at the opposite side to the liquid crystal cell may be mentioned. In the mode of provision of the optical film between a polarizer and liquid crystal cell, it is also possible to arrange an optical device comprised of the above optical film and polarizer in a liquid crystal cell.

The liquid crystal display device can be formed as one having a suitable structure based on past designs arranging a polarizer at one side or both sides of a liquid crystal cell such as a transmission type or reflection type or dual transmission and reflection type. As the liquid crystal mode used for the liquid crystal cells, the in-plane switching (IPS) system, vertical alignment (VA) system, multidomain vertical alignment (MVA) system, continuous pinhole alignment (CPA) system, twisted nematic (TN) system, supertwisted nematic (STN) system, hybrid alignment nematic (HAN) system, optical compensated bend (OCB) system, etc. may be mentioned. Among these, the device can be particularly preferably applied to an IPS system.

In the IPS system, liquid crystal molecules homogeneously oriented in the lateral direction and two polarizers in a perpendicular positional relationship with transmission axes oriented in the longitudinal and lateral directions with respect to the front of the screen are used, so when viewing the screen from the longitudinal or lateral directions, the two transmission axes are in a positional relationship appearing perpendicular, the homogeneously oriented liquid crystal layer has little of the birefringence such as occurring in a twisted type liquid crystal layer, so sufficient contrast can be obtained.

As opposed to this, when viewing the screen inclined from a direction of the azimuth 45 degrees, the transmission axes of the two polarizers are in a positional relationship where they form an angle off from 90 degrees, so linear polarized light is not completely blocked, light leakage occurs, sufficient black cannot be obtained, and the contrast falls. By arranging between the two polarizers of an IPS system liquid crystal display device an optical film comprised of a stretched film according to the present invention, the phase difference occurring in the liquid crystal in the liquid crystal cell is compensated for and the perpendicular arrangement of the transmission axes of the two polarizers is compensated for. Due to this, it is possible to effectively compensate for birefringence occurring in transmitted light and prevent light leakage and possible to obtain a high contrast in all azimuths. This effect is considered to be similar in other types of liquid crystal display devices as well. In particular, the effect is remarkable in the IPS system.

In a liquid crystal display device, at the time of formation of the liquid crystal display device, for example, it is possible to arrange a prism array sheet, lens array sheet, light diffusion plate, backlight, brightness improving film, or other suitable component at a suitable location in one or more layers.

EXAMPLES

Below, examples will be given to explain the present invention in more detail. In the following examples and comparative examples, the stretched film was evaluated by the following methods.

(1) Thickness of Film (μm)

The laminated film (unstretched laminate or stretched film) was buried in an epoxy resin, then a microtome (Yamato Kohki Industrial Co., Ltd., RUB-2100) was used to slice the film to a 0.05 μm thickness. The slice was observed by a transmission type electron microscope, then the thickness of the layers and the total thickness were measured. This was measured in the flow direction at 50 mm intervals across a length of 1000 mm. Further, the average values of the full measurement results were calculated for the thicknesses of the layers and the total thickness.

(2) Tear Strength of Longitudinal Direction (N/mm)

Based on JIS K7128-2 (Elmendorf tear method), a stretched film was measured for strength at the time of pulling the longitudinal direction at the center using a tensile tester (made by Imada, ZP-5N (product name)) in a direction perpendicular to the slow axis. The strength at the time of cracking was defined as the tear strength.

(3) Continuous Transportability

Long stretched film was actually transported in a stretching apparatus to investigate the occurrence of breakage and wrinkles and the extent of the same.

(4) Orientation Angle θ and Variation in Same

The in-plane slow axis of the film (angle formed with width direction of film) was measured at 50 mm intervals in the width direction of the stretched film using a polarization microscope (made by Olympus, polarization microscope BX51). This measurement was a performed at intervals of 50 mm in the flow direction of the stretched film across a length of 1000 mm. All of the measurement results were averaged to obtain the average value of the orientation angle θ. Further, the difference between the largest value and smallest value of the orientation angle was made the variation in the orientation angle θ.

(5) Nz Coefficient and Variation in Same

An automatic birefringence meter (Oji Scientific Instruments, KOBRA-21ADH) was used for measurement at a wavelength of 590 nm at 50 mm intervals in the width direction of the stretched film. This measurement was performed at 50 mm intervals in the flow direction of the stretched film across a length of 1000 mm. All of the measurement results were averaged to obtain the Nz coefficient. Further, the difference between the large value and smallest value of the Nz coefficient was made the variation in the Nz coefficient.

(6) In-Plane Retardation Re and Variation in Same

An automatic birefringence meter (Oji Scientific Instruments, KOBRA-21ADH) was used for measurement at a wavelength of 590 nm at 50 mm intervals in the width direction of the stretched film. This measurement was performed at 50 mm intervals in the flow direction of the stretched film across a length of 1000 mm. All of the measurement results were averaged to obtain the average value of the in-plane direction retardation Re. Further, the difference between the largest value and smallest value of the in-plane retardation Re was made the variation in the in-plane retardation Re.

The in-plane retardation of the "$B_1$" layer and "$B_2$" layer was measured by separately preparing single-layer films of the "$b_1$" layer and "$b_2$" layer, then stretching these under the same conditions as when stretching an unstretched laminate. The in-plane retardation was measured by the same method as the method of measurement of stretched film.

(7) Haze Value of Stretched Film

This was measured in accordance with JIS K7361-1997 using a Hazemeter (made by Nippon Denshoku Industries Co., Ltd., NDH-300A). Note that the measurement point was changed and similar measurement conducted five times. The arithmetic average value was made the haze value.

(8) Durability Test

A laminate of an optical film comprised of a stretched film adhered to a polarizer was bonded to a glass substrate at the side of the stretched film opposite to the polarizer. This was then repeatedly cooled and heated at −40° C. to +85° C. in range 500 times and investigated for blistering, peeling, breakage, etc.

(9) Display Properties in IPS System

An optical device comprised of an optical film comprised of a stretched film adhered to a polarizer was switched with an inlet side polarizer of a commercial in-plane switching (IPS) type liquid crystal display device. The modified liquid crystal display device was visually examined for the screen properties from the front and from an inclined direction. In Table 1, indicates good, "F" indicates fair, and "P" indicates poor.

Example 1

A "$b_1$" layer (70 μm)-"a" layer (40 μm)-"$b_2$" layer (70 μm) unstretched laminate "c" comprised of a "$b_1$" layer and "$b_2$" layer comprised of a methacrylic resin including rubber particles (glass transition temperature 105° C., Vicat softening temperature 103° C.) and an "a" layer comprised of a styrene-maleic anhydride copolymer (Nova Chemical, Dylark D332, glass transition temperature 130° C., Vicat softening temperature 130° C., oligomer ingredient content 3 wt %) was obtained by coextrusion. The obtained unstretched laminate "c" was stretched by simultaneous biaxial stretching by a stretching temperature of 134° C., a stretching speed of 107%/min, an MD (flow direction) stretching ratio of 1.6 times, a TD (width direction) stretching ratio of 1.2 times to obtain a stretched film of a width of 1200 mm, and a thickness (total thickness) of 94 μm. At this time, as shown by "yes" in the corresponding fields of Table 1, the takeup tension was controlled and the heat fixing temperature was controlled to make the orientation angle profile flat.

The obtained stretched film, as shown in Table 1, was extremely good in mechanical strength (tear strength and continuous transportability), optical characteristics (orientation angle, variation of orientation angle, Nz coefficient, and variation of Nz coefficient). This stretched film and a polarizer with a transmission axis in the length direction were laminated by the roll-to-roll method. An optical device was cut out from the rolled laminate. This was bonded to a glass substrate and subjected to a durability test. The result was good, that is, "OK". Further, the optical device was switched with the inlet side polarizer of a commercially available in-plane switching (IPS) system liquid crystal display device. The obtained liquid crystal display device was visually confirmed for display properties. As a result, the display was excellent and uniform when viewing the screen from the front and when viewing it from an inclined direction.

Example 2

Except for making the ratio of the "a" layer ("A" layer), TD stretching ratio, and thicknesses of the layers of the unstretched laminate different from Example 1 as shown in Table 1, the same procedure was followed as in Example 1. The mechanical strength, optical characteristics, durability, and display properties were excellent.

Example 3

Except for making the ratio of the "a" layer ("A" layer), stretching temperature, MD stretching ratio, TD stretching ratio, and thicknesses of the layers of the unstretched laminate different from Example 1 as shown in Table 1, the same procedure was followed as in Example 1. Partial breakage occurred intermittently in the continuous transportability of the mechanical strength, but the optical characteristics, durability, and display properties were excellent.

Comparative Example 1

Except for changing the stretching method to sequential biaxial stretching (longitudinal stretching, then lateral stretching) and making the MD stretching ratio and TD stretching ratio different from Example 1 as shown in Table 1, the same procedure was followed as in Example 1. The mechanical strength and durability were excellent, but the optical characteristics and display properties were degraded.

Comparative Example 2

Except for changing the stretching method to longitudinal monoaxial stretching and making the ratio of the "a" layer ("A" layer), MD stretching ratio, and thicknesses of the layers of the unstretched laminate different from Example 1 as shown in Table 1, the same procedure was followed as in Example 1. The continuous transportability in the mechanical strength was not a problem, but the tear strength deteriorated. Further, the optical characteristics also deteriorated. Furthermore, the durability was no good "NG". The display properties were not evaluated since the durability was no good. Note that, in the Table 1, "-" indicates no evaluation was performed.

Comparative Example 3

Except for changing the stretching method to sequential biaxial stretching (lateral stretching, then longitudinal stretching), the same procedure was followed as in Example 1. Wrinkles intermittently occurred in the continuous transportability of the mechanical strength. For this reason, the tear strength, durability, and display properties were not evaluated. In the Table 1, "-" indicates no evaluation was performed.

Comparative Example 4

Except for changing the stretching method to lateral monoaxial stretching and making the ratio of the "a" layer ("A" layer), MD stretching ratio, TD stretching ratio, and thicknesses of the layers of the unstretched laminate different from Example 1 as shown in Table 1, the same procedure was followed as in Example 1. Full fracture frequently occurred in the continuous transportability of the mechanical strength. For this reason, the tear strength, durability, and display properties were not evaluated. In the Table 1, "-" indicates no evaluation was performed.

Comparative Example 5

Except for not controlling the takeup tension and controlling the heat fixing temperature as shown by the "No" in the corresponding fields in Table 1, the same procedure was followed as in Example 1. The optical characteristics (in particular, the variation of the orientation angle θ) deteriorated and, as shown by the "F (fair)" in the corresponding fields of Table 1, the results of observation of the display properties from the front were somewhat inferior.

TABLE 1

|  | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Unstretched laminate Average thickness (μm) | | | | | | | | |
| "a" layer | 40 | 60 | 60 | 40 | 40 | 40 | 150 | 40 |
| "$b_1$" layer | 70 | 60 | 50 | 70 | 60 | 70 | 45 | 70 |
| "$b_2$" layer | 70 | 60 | 50 | 70 | 60 | 70 | 45 | 70 |
| Total thickness | 180 | 180 | 160 | 180 | 160 | 180 | 240 | 180 |
| Ratio of "a" layer (wt %) | 22 | 33 | 38 | 22 | 25 | 22 | 63 | 22 |
| Stretching method | Simul. biaxial | Simul. biaxial | Simul. biaxial | Sequen. biaxial | Vert. monoaxial | Sequen. biaxial | Horiz. monoaxial | Simul. biaxial |
| Takeup tension control | Yes | Yes | Yes | Yes | Yes | Yes | Yes | No |
| Heat fixing temperature control | Yes | Yes | Yes | Yes | Yes | Yes | Yes | No |
| Stretching temperature (° C.) | 134 | 134 | 138 | 134 | 134 | 134 | 134 | 134 |
| Long direction stretching ratio (X) | 1.6 | 1.6 | 1.5 | 1.2 | 1.2 | 1.6 | 1 | 1.6 |
| Width direction stretching ratio (X) | 1.2 | 1.3 | 1.2 | 1.5 | — | 1.2 | 2.6 | 1.2 |
| Stretched film Average thickness (μm) | | | | | | | | |
| "A" layer | 21 | 28 | 31 | 21 | 37 | 21 | 58 | 21 |
| "$B_1$" layer | 36 | 28 | 26 | 36 | 55 | 36 | 17 | 36 |
| "$B_2$" layer | 36 | 28 | 26 | 36 | 55 | 36 | 17 | 36 |
| Total thickness | 94 | 85 | 83 | 94 | 146 | 94 | 92 | 94 |
| Optical characteristics | | | | | | | | |

TABLE 1-continued

| | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Average value of orientation angle θ(°) | 0 | 0 | 0 | 90 | 0 | — | — | 0 |
| Variation of orientation angle θ(°) | 0.35 | 0.4 | 0.4 | 0.6 | 0.3 | — | — | 1.5 |
| Nz coefficient | −1.5 | −2.4 | −1.9 | −0.8 | −0.01 | — | — | −3.2 |
| Variation in Nz coefficient | 0.08 | 0.10 | 0.15 | 0.10 | 0.1 | — | — | 0.1 |
| Haze (%) | 1.4 | 1.5 | 1.3 | 1.3 | 2.4 | — | — | 1.4 |
| Average value of Re of stretched film (nm) | 50 | 40 | 55 | 50 | 110 | — | — | 50 |
| Variation of Re of stretched film (nm) | 1.9 | 2.9 | 2.7 | 2.5 | 2.0 | — | — | 3.5 |
| Re of "B$_1$" layer (nm) | 1.0 | 0.8 | 1.2 | 1.0 | 3.0 | — | — | 1.0 |
| Re of "B$_2$" layer (nm) | 1.0 | 0.8 | 1.2 | 1.0 | 3.0 | — | — | 1.0 |
| Mechanical strength | | | | | | | | |
| Tear strength (N/mm) | 1.39 | 1.45 | 1.1 | — | 0.74 | — | — | 1.39 |
| Continuous transportability | No break | No break | Partial break continuously | No break | No break | Continuous wrinkle | Frequent full break | No break |
| Durability test | OK | OK | OK | OK | NG | — | — | OK |
| Display characteristics in IPS system | | | | | | | | |
| Seen from front | G | G | G | P | — | — | — | F |
| Seen from inclined direction | G | G | G | P | — | — | — | G |

The embodiments and examples described hereinabove have been presented for easy understanding of the invention and are not intended to limit the invention. Accordingly, the respective elements disclosed in the foregoing embodiments and examples shall be construed to cover all design modifications and equivalents that fall within the technical scope of the invention.

Note that the present invention relates to matter included in Japanese Patent Application No. 2007-305977 filed on Nov. 27, 2007. All of the disclosure is clearly incorporated by reference.

The invention claimed is:

1. A process for producing a stretched film comprised of a "B" layer comprised of a methacrylic resin 1, an "A" layer comprised of a styrene-based resin, and a "B$_2$" layer comprised of a methacrylic resin 2, stacked in that order, simultaneously biaxially stretched, and having a width of over 1000 mm, comprising a step of heat fixing at a heating zone arranged at an oven outlet of a simultaneous biaxial stretching apparatus with heat fixing temperature that is lower than stretching temperature and a step of giving takeup tension in a section from the oven outlet to a takeup of the stretched film, wherein the stretching temperature is in a range of 126 to 134° C., wherein a ratio of the "A" layer in said stretched film is 45 wt % or less, an average value of an orientation angle θ with respect to a width direction across at least 1000 mm of the width direction is 0°±1°, a variation in the orientation angle θ is 0.5° or less, an average value of an Nz coefficient is −3.5 to −0.5 in range, and an average value of an in-plane direction retardation Re of the "A" layer that is measured by light having a wavelength of 400-700 nm is 30 nm to 70 nm, wherein the takeup tension and the heat fixing temperature are controlled to maintain the variation in the orientation angle θ to be 0.5° or less.

2. The process for producing the stretched film as set forth in claim 1, wherein said ratio of the "A" layer is 35 wt % or less.

3. The process for producing the stretched film as set forth in claim 1 or 2, wherein a variation of the Nz coefficient is 0.2 or less.

4. The process for producing the stretched film as set forth in claim 1 or 2, wherein an average value of an in-plane direction retardation Re that is measured by light having a wavelength of 400-700 nm is 80 nm or less.

5. The process for producing the stretched film as set forth in claim 4, wherein a variation of the in-plane direction retardation Re that is measured by light having a wavelength of 400-700 nm is 3 nm or less.

6. The process for producing the stretched film as set forth in claim 1 or 2, wherein an in-plane direction retardation Re of at least one of said "B$_1$" layer and said "B$_2$" layer that is measured by light having a wavelength of 400-700 nm is 0 nm to 15 nm in range.

7. The process for producing the stretched film as set forth in claim 1 or 2, wherein a ratio of an average thickness of said "B$_1$" layer and an average thickness of said "A" layer ("B$_1$" layer/"A" layer) is 2/1 to 1/1 and a ratio of an average thickness of said "B$_2$" layer and the average thickness of said "A" layer ("A" layer/"B$_2$" layer) is 1/1 to 1/2.

8. The process for producing the stretched film as set forth in claim 1 or 2, wherein a haze is over 1% to not more than 5%.

9. The process for producing the stretched film as set forth in claim 1, wherein the heat fixing temperature is maintained within the range of: the stretching temperature value−30° C. to less than the stretching temperature value, and wherein the takeup tension is controlled by lowering the takeup tension when bowing occurs or raising the takeup tension when reverse bowing occurs.

10. The process for producing the stretched film as set forth in claim 1 or 2, comprising
a step of using melt coextrusion to obtain an unstretched laminate "c" comprised of a "b$_1$" layer comprised of a methacrylic resin 1, an "a" layer comprised of a styrene-based resin, and a "b$_2$" layer comprised of a methacrylic resin 2 stacked in that order and
a step of stretching said laminate by simultaneous biaxial stretching to give the stretched film comprised of the "B$_1$" layer, the "A" layer, and the "B$_2$" layer stacked in that order.

11. The process for producing the stretched film as set forth in claim 10 wherein a stretching ratio in a longitudinal direction is 1.25 to 1.5 times a stretching ratio in a width direction.

12. An in-plane switching (IPS) type liquid crystal display device comprised of an optical device produced using the stretched film produced by the process for producing the stretched film as set forth in claim 1 or 2.

* * * * *